Jan. 3, 1956 W. A. WAGNER 2,729,457
NIPPLE CHUCK
Filed Oct. 18, 1954
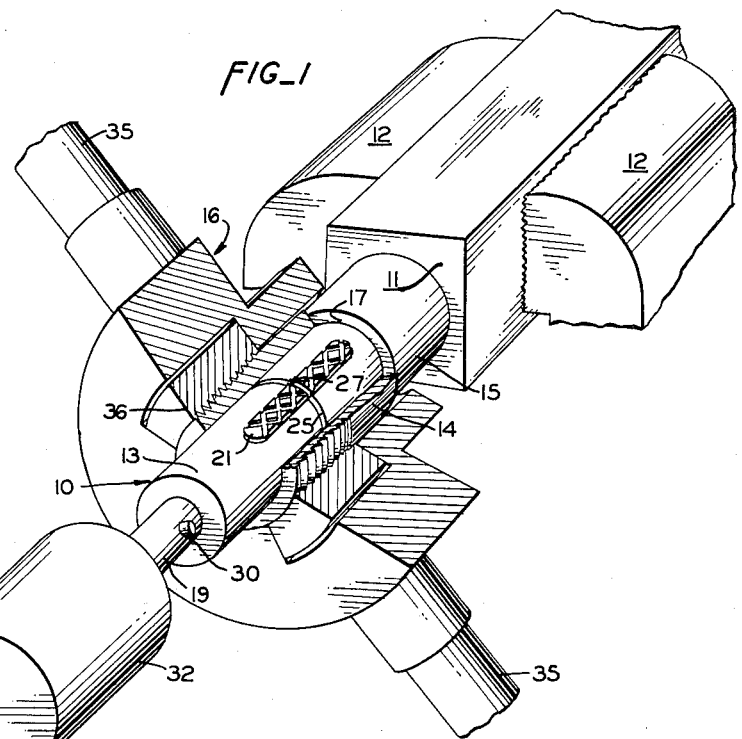
FIG_1
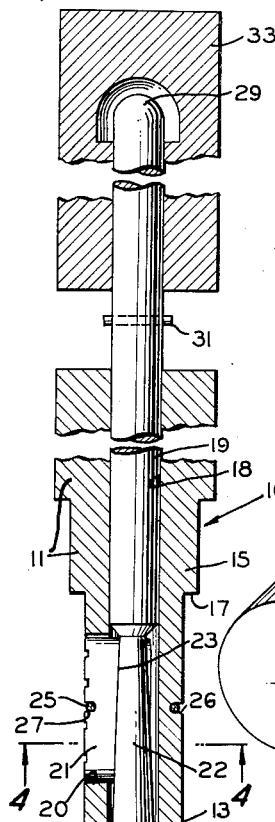
FIG_2
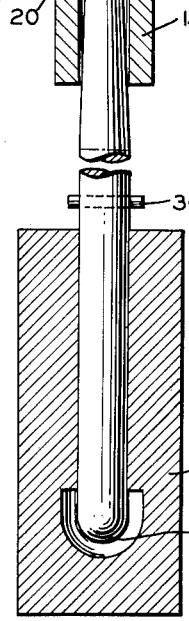
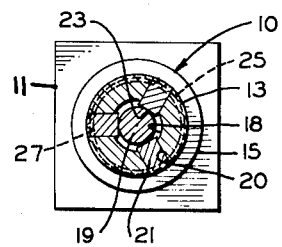
FIG_3
FIG_4
INVENTOR:
WALTER A. WAGNER
BY
Hansen and Lane
HIS ATTORNEYS United States Patent Office 2,729,457
Patented Jan. 3, 1956

2,729,457

NIPPLE CHUCK

Walter A. Wagner, San Jose, Calif.

Application October 18, 1954, Serial No. 463,009

6 Claims. (Cl. 279—2)

This invention relates to improvements in expanding jaw nipple chucks suitable for holding short lengths of pipe while an external thread is being cut thereon, and more particularly to such a nipple chuck suitable for use where a plumbing installation is being made in the field.

It has been the practice heretofore to expand the jaws of such devices with a tapered member having a relatively wide angle which is actuated by means of an extended threaded shaft and nut to expand the jaws and hold them in expanded position. Such wide angle, thread operated devices have a practical defect in actual use. For example, when a short nipple, that is a nipple that will be substantially completely covered with threads when finished, is being threaded, it becomes very hot because of the high friction generated by the cutting dies. The nipple will expand due to high increase in temperature; and it will also further expand due to the removal of external metal which relieves the stress on the expanding parts of the chuck. As a result of these two effects, it becomes necessary to take up on the holding jaws during the threading operation in order to maintain the jaws in sufficiently tight contact with the nipple to prevent turning thereof. Consequently by the time the threading operation is completed, the nipple will frequently have been expanded through the combined action of jaw pressure and temperature expansion until there is danger that the welded seam in the pipe, or even the base metal, will separate if the nipple is permitted to cool and contract on the jaws.

With prior type devices sufficient time may elapse while the operator is unscrewing a nut to release the jaws to permit the newly threaded nipple to cool off while under the influence of the expanded jaws. This delay during cooling or contraction of the nipple often causes a rupturing of the seam.

It is an important object of this invention, therefore, to provide a nipple chuck wherein the pressure of the jaws can be released substantially instantaneously following the removal of the cutting die from the nipple.

It is also an object of this invention to provide a nipple chuck wherein the jaws can be expanded quickly when chucking a nipple.

Further objects are to provide a device that is simple and rugged; also such further objects, advantages and capabilities as will fully appear and as are inherently possessed by the device and the invention described herein.

The invention further resides in the combination, construction, and arrangement of parts illustrated in the accompanying drawings, and while there are shown preferred embodiments thereof, it is to be understood that the same are merely illustrations of the invention and that the mechanism is capable of modification and change, and the invention comprehends other details of construction without departing from the essence thereof or the scope of the appended claims.

Fig. 1 is a perspective view of the device of my invention showing a nipple in process of being threaded. Certain parts are sectioned to show the internal operation.

Fig. 2 is a sectional view of my invention taken on a central plane.

Fig. 3 is a fragmentary section taken on a central plane showing how a nipple is chucked.

Fig. 4 is a transverse section viewed as indicated by the arrows 4—4 of Fig. 2.

In Fig. 1, the device 10 of the present invention comprises a main body 11 adapted to be held in the jaws 12 of a bench vise. I prefer to use a main body which is square in cross section for the reason that it may be held in a bench vise as shown or that it may be readily held in a pipe vise by turning the corners of the main body into the V of the pipe vise jaws in the well known manner. The main body 10 further includes a cylindrical boss 13 extending from one end of the body 10. This boss 13 is of a size suitable to receive a short length of pipe or a nipple 14 and is therefore referred to as a nipple or pipe supporting boss or cylindrical end. Between the boss 13 and the main body 10 there is provided a larger cylindrical portion 15 of a diameter such as to receive the open leading end of the pipe threading die 16. This larger cylindrical portion 15 being midway the ends of the main body is therefore referred to as a threading die guiding midportion. This larger diametered midportion thus provides a shoulder 17 on the inner end of the boss 13 to provide a stop or abutment for the end of the nipple 14 as illustrated in Fig. 3. This shoulder 17 is therefore referred to as a pipe or nipple abutting shoulder.

As best seen in Fig. 2, the main body including members 10, 13 and 15 are bored as at 18 to provide slidable contact support for an actuating rod 19.

The portion 13 of the main body 10 has longitudinal slots 20 milled through its outer walls to provide slidable contact support for chuck jaws 21. Thus the jaws 21 are situated in a region of cylindrical portion 13 for contacting the inner wall of the nipple 14. As most clearly shown in Fig. 4, I prefer to use three jaws to insure good contact of each jaw with the internal surface of the nipple. As indicated in the several views, the contact surface of each jaw is milled or roughened in the well known manner and accordingly are referred to as nipple engaging or holding jaws.

The external portion of the actuating rod 19 has a taper 22 formed thereon in such a position as to engage the inner faces 23 of the jaws 21. The inner faces 23 of the jaws 21 are tapered to conform to the contour of taper 22. Thus, when the tapered portion 22 of the rod 19 is forced against the internal faces 23 of the jaws 21 the latter will be expanded radially outwardly in the well known manner.

A restraining spring 25 encircles the jaws 21. In this connection, the portion 13 of the main body 10 is provided with an annular groove 26 midway between the ends of the slots 20. Each of the jaws 21 are also provided with peripheral grooves 27 in register with the annular groove 26 formed in the portion 13. Thus the retaining spring 25 seats in the annular groove 26 and extends through the peripheral grooves 27 in the several jaws to prevent the latter from falling out when no nipple is on the portion 13 of the main body 10.

In the device of the present invention, the taper 22 on the rod 19 is such as to have surface contact with the inner faces 23 of the jaws 21 at all time. In this manner uniform outward pressure is exerted against the jaws 21 irrespective of their inner or outer limits of movement.

In addition to the foregoing, it will be noted that the angle of the face of the taper 22 relative to the axis of the rod 19 is very slight.

The actuating rod 19 is driven in by impact and is held firmly in place by the force of static friction between the taper and the inner surface of the jaws. I find that, if the included angle of the taper is from two to five degrees, static friction will prevent the taper from slipping, and the jaws will remain in firm contact with the nipple after impact upon the actuating rod. Thus it will be seen that the radial shifting of the jaws 21 upon driving in the taper by impact is positive and quickly accomplished, resulting in a worthwhile saving of the operator's time.

It will thus be seen that in threading short length of pipe such as the nipple 14 the same is slid onto the portion 13 of the main body 10 until the nipple engages the shoulder 17. As previously stated, the arrangement is such that the nipple slides onto the portion 13 without any obstruction since the jaws 21 are normally retained within the periphery of the portion 13 by the retaining spring 25 which seats in the annular groove 26. However, when the rod 16 is impacted at its one end 28 to drive the larger end of the tapered portion 22 toward the jaws 21, the jaws expand to promptly engage the inner wall of the pipe nipple.

Another feature of the present invention resides in the provision of the intermediate portion 15 of the main body at such a diameter as to provide the stop shoulder 17 for the nipple but more particularly to receive the open fore end of the pipe threading die 16 as illustrated in Fig. 3 so that threads can be cut on the short (nipple) length of pipe up to its mid point at least.

After a thread has been cut and the die removed the pressure of the jaws can be released substantially instantaneously by impact applied to the opposite end 29 of the actuating rod 19. It will thus be appreciated that there is a saving in time by merely applying impact to accomplish the releasing operation. The greatest saving, however, resides in the fact that shrinkage and ultimate cracking or rupturing of a nipple is minimized when the device of the present invention is used.

Referring again to the drawing, it will be noted that pins 30 and 31 are fixed in the rod 19 at such positions along its length as permit shifting of the tapered portion 28 relative to the jaws 21 and to prevent it from sliding completely through the bore during transportation and handling.

Impact can be applied to the rounded or chamfered ends of the actuating rod 19 by means of a hammer when setting or releasing the taper. However, some time may be saved by using impact heads 32 and 33, which are slidably and removably mounted on the ends 28 and 29, respectively, of the rod, instead of using an ordinary hammer. For then when the operator is cutting a thread, as indicated in the mechanism of Fig. 1, he will ordinarily be standing in front and to one side where he can operate the handles 35 of the die head 16 and, at the same time, see when the ends of the dies 36 have completed a thread. Then, if the nipple 14 becomes loose on the jaws 21 due to temperature expansion, the operator does not have to reach for a hammer but can simply reach out and tap the end of the actuating rod 19 by sliding impact head 32 which will be in place and readily available. Similarly, when he wishes to release the jaws 21 relative to the nipple, he can do so in the minimum time by tapping the opposite end 29 of the actuating rod 19 with impact head 33.

While I have described my improved nipple chuck in specific detail, it will be apparent that the same may be modified, varied and/or altered without departing from the spirit of the invention. I, therefore, desire to avail myself of all modifications, variations and/or alterations as fairly come within the purview of the appended claims.

What I claim as new and desire to protect by Letters Patent is:

1. A nipple chuck comprising a main body having one end square in cross section, an opposite nipple supporting cylindrical end, and a mid portion of a diameter to provide a nipple abutting shoulder adjacent said cylindrical end, said main body having an axial bore, an actuating rod guided for sliding movement in the axial bore of said main body and having both its ends extending therefrom for impact, said nipple supporting cylindrical end having a plurality of longitudinal slots formed therethrough, a nipple engaging chuck jaw in each of the longitudinal slots in said cylindrical end, said actuating rod having a slight tapered portion disposed in the region of said cylindrical end, and conforming tapered inner faces on said jaws engageable by the tapered portion of said actuating rod for effecting outward radial movement of said jaws relative to said cylindrical end upon sliding movement of said actuating rod in one direction.

2. A nipple chuck comprising a main body having a vice jaw engaging end, an opposite nipple supporting cylindrical end, and a threading die guiding mid portion of a diameter to provide a nipple abutting shoulder adjacent said cylindrical end, said main body having an axial bore, an actuating rod arranged for sliding movement in the axial bore of said main body with both its ends extending therefrom for impact, said actuating rod having a slight angle tapered portion disposed in the region of said cylindrical end, said cylindrical end having a plurality of longitudinal slots formed therethrough, a chuck jaw in each of the longitudinal slots in said cylindrical end provided with tapered inner faces conforming with the tapered portion of said actuating rod and engaging the same for effecting radial movement of said chuck jaws outwardly relative to said cylindrical end upon impact against one end of said actuating rod for moving the same in a direction to drive said tapered portion into full frictional contact with the tapered inner faces of said chuck jaws.

3. A nipple chuck comprising a main body having an enlarged vice jaw engaging end, an opposite pipe supporting cylindrical end, and a threading die guiding mid portion of a diameter to provide a pipe engaging shoulder adjacent said cylindrical end, said main body having an axial bore, an actuating rod arranged for sliding movement in the axial bore of said main body with both its ends extending therefrom for impact, said actuating rod having a slight angle tapered portion disposed in the region of said pipe supporting cylindrical end, said cylindrical end having a plurality of longitudinal slots formed therethrough, a pipe chucking jaw in each of the longitudinal slots in said cylindrical end provided with tapered inner faces conforming with the tapered portion of said actuating rod and engaging the same for effecting radial movement of said jaws outwardly relative to said cylindrical end upon impact against one end of said actuating rod for moving the same in a direction to drive said tapered portion into frictional contact with the tapered inner faces of said jaws, said cylindrical end having an annular groove formed round the same and communicating with each of the slots formed therein, each of said jaws having a transverse notch formed therein in register with the annular groove formed on said cylindrical end, and a retaining ring in said annular groove and said notches in each of said jaws for maintaining the latter in their respective slots.

4. A nipple chuck comprising a main body having one end parallel sided cross section, an opposite pipe supporting cylindrical end, and a threading die guiding mid portion of a diameter to provide a pipe abutting shoulder adjacent said cylindrical end, said main body having an axial bore, an actuating rod arranged for sliding movement in the axial bore of said main body and having both its ends extending therefrom, an impact head mounted on each end of said actuating rod, said cylindrical end having a plurality of longitudinal slots formed therethrough, a pipe chucking jaw in each of the longitudinal slots in said cylindrical end, said actuating rod having a tapered portion disposed in the region of said cylindrical end, and conforming tapered inner faces on each of said chucking jaws engageable by the tapered portion of said actuating rod for effecting outward radial movement of said jaws relative to said cylindrical end upon impacted movement of said actuating rod in one direction by operation of the impact head on the opposite end of said actuating rod.

5. A nipple chuck comprising a main body having a vice jaw engaging large end, an opposite pipe supporting cylindrical end, and a threading die guiding mid portion of a diameter to provide a pipe abutting shoulder adjacent said cylindrical end, said main body having an axial bore, an actuating rod arranged for sliding movement in the axial bore of said main body with both its ends extending therefrom, an impact head on each extended end of said actuating rod, said actuating rod having a slight angle tapered portion disposed in the region of said, pipe supporting cylindrical end, said cylindrical end having a plurality of longitudinal slots formed therethrough, a chuck jaw in each of the longitudinal slots in said cylindrical end provided with tapered inner faces conforming with the tapered inner faces conforming with the tapered portion of said actuating rod and engaging the same for effecting radial movement of said jaws outwardly relative to said pipe supporting cylindrical end upon movement of one of said impact heads against one end of said actuating rod for moving the same in a direction to drive said tapered portion into full frictional contact with the tapered inner faces of said jaws.

6. A nipple chuck comprising a main body having a vice jaw engaging large end, an opposite pipe supporting cylindrical end, and a threading die guiding mid portion of a diameter to provide a pipe abutting shoulder adjacent said cylindrical end, said main body having an axial bore, an actuating rod arranged for sliding movement in the axial bore of said main body with both of its ends extending therefrom, an impact head on each extended end of said actuating rod, said actuating rod having a slight angle tapered portion disposed in the region of said pipe supporting cylindrical end, said cylindrical end having a plurality of longitudinal slots formed therethrough, a chuck jaw in each of the longitudinal slots in said cylindrical end provided with tapered inner faces conforming with the tapered portion of said actuating rod and engaging the same for effecting radial movement of said jaws outwardly relative to said pipe supporting cylindrical end upon movement of one of said impact heads against one end of said actuating rod for moving the same in a direction to drive said tapered portion into full frictional contact with the tapered inner faces of said jaws, said cylindrical end having an annular groove formed round the same and communicating with each of the slots formed therein, each of said jaws having a transverse notch formed therein in register with the annular groove formed on said cylindrical end, and a retaining ring in said annular groove and said notches in each of said jaws for maintaining the latter in their respectve slots.

References Cited in the file of this patent

UNITED STATES PATENTS

| | | |
|---|---|---|
| 1,432,121 | Prickett | Oct. 17, 1922 |